United States Patent
Chen et al.

(10) Patent No.: US 7,915,068 B2
(45) Date of Patent: Mar. 29, 2011

(54) METHOD FOR MAKING SOLAR CELLS WITH SENSITIZED QUANTUM DOTS IN THE FORM OF NANOMETER METAL PARTICLES

(75) Inventors: Meng-Chu Chen, Taichung (TW); Shan-Ming Lan, Daxi (TW); Tsun-Neng Yang, Taipei (TW); Zhen-Yu Li, Minxiong Shiang (TW); Yu-Han Su, Kaohsiung (TW); Chien-Te Ku, Pingzhen (TW); Yu-Hsiang Huang, Pingzhen (TW)

(73) Assignee: Atomic Energy Council—Institute of Nuclear Energy Research, Taoyuan (TW)

( * ) Notice: Subject to any disclaimer, the term of this patent is extended or adjusted under 35 U.S.C. 154(b) by 0 days.

(21) Appl. No.: 12/076,244

(22) Filed: Mar. 14, 2008

(65) Prior Publication Data

US 2011/0027931 A1    Feb. 3, 2011

(51) Int. Cl.
*H01L 21/00* (2006.01)
*H01L 27/14* (2006.01)
*H01L 31/0232* (2006.01)

(52) U.S. Cl. ............ 438/65; 438/57; 438/64; 257/428; 257/431; 257/436; 977/773; 977/774; 977/775; 977/776; 977/777; 977/810; 977/948

(58) Field of Classification Search ............... 438/57, 438/64, 65; 257/428, 431, 436; 977/773–777, 977/810, 948
See application file for complete search history.

(56) References Cited

U.S. PATENT DOCUMENTS

| | | | | |
|---|---|---|---|---|
| 6,310,282 B1 * | 10/2001 | Sakurai et al. | ................ | 136/263 |
| 7,132,598 B2 * | 11/2006 | Nelles et al. | ................ | 136/263 |
| 2001/0004901 A1 * | 6/2001 | Yamanaka et al. | ............ | 136/263 |
| 2006/0016473 A1 * | 1/2006 | Choi et al. | .................... | 136/263 |
| 2006/0260674 A1 * | 11/2006 | Tran | .............. | 136/252 |
| 2007/0062576 A1 * | 3/2007 | Duerr et al. | .................... | 136/263 |
| 2007/0119048 A1 * | 5/2007 | Li et al. | ....................... | 29/623.5 |
| 2007/0289628 A1 * | 12/2007 | Sohn et al. | ................... | 136/264 |
| 2008/0092953 A1 * | 4/2008 | Lee | ................. | 136/261 |

* cited by examiner

*Primary Examiner* — Michael S Lebentritt
*Assistant Examiner* — Karen M Kusumakar
(74) *Attorney, Agent, or Firm* — Jackson IPG PLLC; Demian K. Jackson

(57) ABSTRACT

There is disclosed a method for making solar cells with sensitized quantum dots in the form of nanometer metal crystals. Firstly, a first substrate is provided. Then, a silicon-based film is grown on a side of the first substrate. A pattern mask process is executed to etch areas of the silicon-based film. Nanometer metal particles are provided on areas of the first substrate exposed from the silicon-based film. A metal electrode is attached to an opposite side of the first substrate. A second substrate is provided. A transparent conductive film is grown on the second substrate. A metal catalytic film is grown on the transparent conductive film. The second substrate, the transparent conductive film and the metal catalytic film together form a laminate. The laminate is inverted and provided on the first substrate. Finally, electrolyte is provided between the first substrate and the metal catalytic film.

7 Claims, 9 Drawing Sheets

METHOD FOR MAKING SOLAR CELLS WITH SENSITIZED QUANTUM DOTS IN THE FORM OF NANOMETER METAL PARTICLES

BACKGROUND OF INVENTION

1. Field of Invention

The present invention relates to a method for making solar cells with sensitized quantum dot and, more particularly, to a method for making solar cells with sensitized metal quantum solar cells in the form of nanometer metal particles.

2. Related Prior Art

Environmental pollution has drawn the attention of the world. There are concerns about global warming caused by the emission of carbon dioxide after consuming fossil fuel for example. Environmentally, there is a need for cleaner energy.

On the other hand, fossil fuel is running out. The price for fossil energy is skyrocketing. Economically, there is need for alternative energy.

People around the world are exploring non-fossil energy such as solar energy, wind power, geothermal energy, fuel cells and bio-energy, intending to reduce the burden that we put on the environment and generating sustainable energy. Solar energy is promising for being clean and safe environmentally, sustainable and inexpensive economically and almost everywhere.

Silicon solar cells were invented in the Bell Laboratory, USA in the 1970s. Silicon solar cells are operated based on the photovoltaic effect of silicon semiconductors. Silicon solar cells convert sunlit into electricity at high photovoltaic efficiencies. However, there are problems with the use of silicon solar cells. Firstly, their production is complicated. Secondly, they are expensive. Thirdly, they are demanding about raw materials.

Dye-sensitized solar cells were invented based on nanometer crystals in the 1990s. Nanometer crystal films of wide band gap semiconductors are used in dye-sensitized solar cells. Nanometer crystal films include huge specific surface areas for attracting much photosensitive dye, thus forming semiconductor electrodes to convert sunlit into electricity. The photovoltaic efficiencies of dye-sensitized solar cells are high while the prices are low. It is very likely that dye-sensitized solar cells will replace silicon solar cells in the future.

In operation, the molecules of the dye of a dye-sensitized solar cell absorb sunlit so that their electrons jump into an exited state from a ground state and rapidly move to a semiconductor band, thus leaving holes in the dye. The electrons spread to a conductive base and then move to paired electrodes via a circuit. The oxidized dye is reduced by electrolyte. The oxidized electrolyte is reduced by receiving electrons from the paired electrodes. That is, the electrons are returned into the ground state. Thus, the circulation of the electrons is completed.

A key factor for the performance of the dye-sensitized solar cell is the speed of the electrons traveling to the semiconductor band after the photochemical reaction. A single-semiconductor nanometer crystal film electrode is problematic in transmitting electrons. There is no built-in electric field, unlike a bulk semiconductor. Moreover, the nanometer particles are too small to form any space charge layer between the nanometer particles and the electrolyte. The migration rate of the electrons is low, and the chance that the electrons and electric acceptors reunite is high. Therefore, the photovoltaic efficiency is low.

In Chinese Patent Application No. 01140225 published on 22 May 2002, disclosed is a nanometer crystal film solar cell related to a dye-sensitized solar cell as shown in FIG. 9 of the attached drawings of the present application. It includes an electrode 5. The electrode 5 includes a transparent conductive substrate 51, a nanometer crystal film 52 made of a wide band gap semiconductor and formed on the transparent conductive substrate 51, a metal ion-attracting layer 53 formed on the nanometer crystal film 52 and a sensitizer layer 54 provided on the metal ion-attracting layer 53.

Decorated by the metal ions, the photovoltaic efficiency of the electrode 5 is increased. When the nanometer crystal film 52 is coated on the transparent conductive substrate 51 via sintering at 200 to 600 degrees Celsius, abnormal accumulation often occurs so that the soaking of titanium dioxide in the dye is poor and that the expansion of the surface of the electrode 5 is limited. Hence, the photovoltaic efficiency is low.

The present invention is therefore intended to obviate or at least alleviate the problems encountered in prior art.

SUMMARY OF INVENTION

The primary objective of the present invention is to provide a method for making solar cells with sensitized quantum dots in the form of nanometer metal particles.

To achieve the foregoing objective of the present invention, the method includes the step of providing a first substrate. Then, a silicon-based film is grown on a side of the first substrate. A pattern mask process is executed to etch areas of the silicon-based film. Nanometer metal particles are provided on areas of the first substrate exposed from the silicon-based film. A metal electrode is attached to an opposite side of the first substrate. A second substrate is provided. A transparent conductive film is grown on the second substrate. A metal catalytic film is grown on the transparent conductive film. The second substrate, the transparent conductive film and the metal catalytic film together form a laminate. The laminate is inverted and provided on the first substrate. Electrolyte is provided between the first substrate and the metal catalytic film.

Other objectives, advantages and features of the present invention will become apparent from the following description referring to the attached drawing.

BRIEF DESCRIPTION OF DRAWING

The present invention will be described via the detailed illustration of the preferred embodiment referring to the attached drawing.

DETAILED DESCRIPTION OF PREFERRED EMBODIMENT

Figure 1:
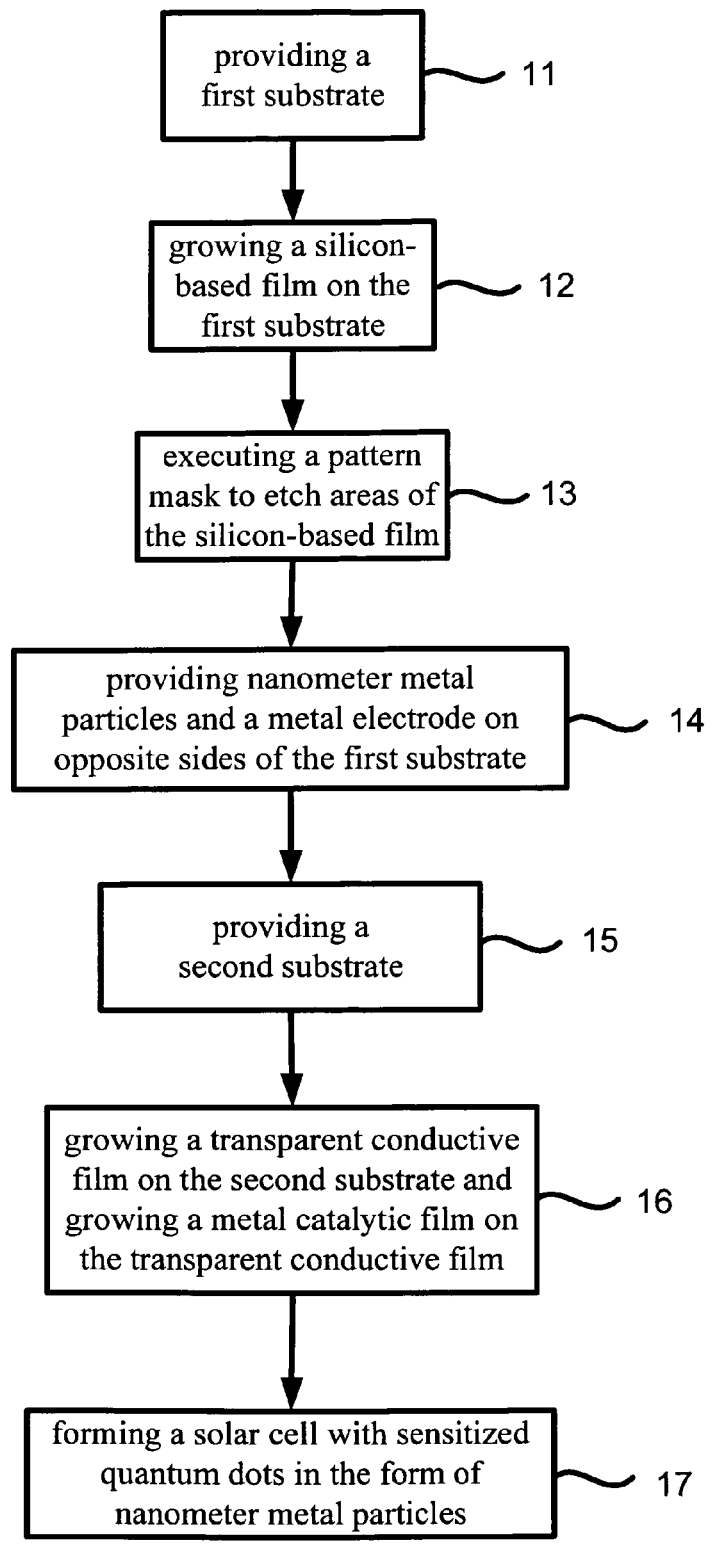
FIG. 1 is a flowchart of a method for making solar cells with sensitized quantum dots in the form of nanometer metal crystals according to the preferred embodiment of the present invention.

Referring to FIG. 1, there is shown a method for making solar cells with sensitized quantum dots in the form of nanometer metal particles according to the preferred embodiment of the present invention.

Figure 2:
FIG. 2 is a side view of a substrate used in the method shown in FIG. 1.

Referring to FIGS. 1 and 2, at 11, there is provided a first substrate 21. The first substrate 21 may be made of sapphire, quartz, silicon carbide or polyethylene.

Figure 3:
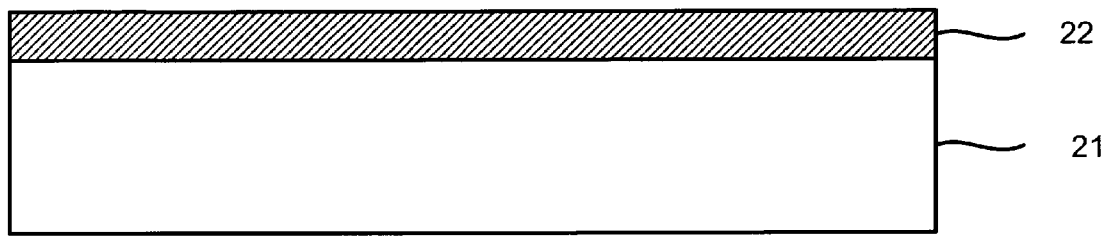
FIG. 3 is a side view of an oxide film provided on the substrate shown in FIG. 2.

Referring to FIGS. 1 and 3, at 12, a silicon-based film 22 is grown on the first substrate 21. The silicon-based film 22 is made of silicon dioxide or silicon nitride.

Figure 4:
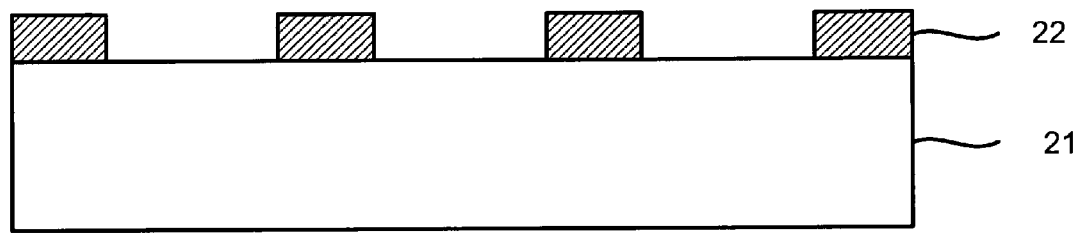
FIG. 4 is a side view of a laminate after partially etching the oxide film shown in FIG. 3.

Referring to FIGS. 1 and 4, at 13, the silicon-based film 22 is subjected to a pattern mask process so that redundant areas of the silicon-based film 22 are etched, leaving useful area.

Figure 5:
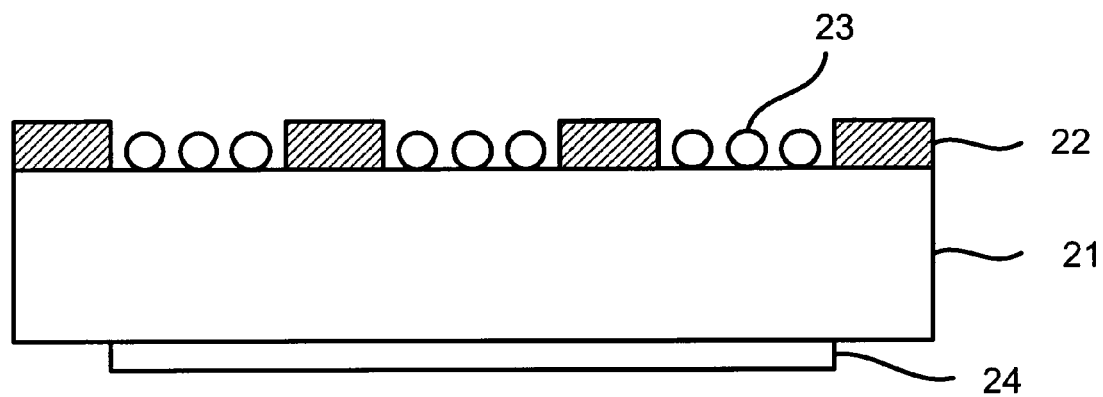
FIG. 5 is a side view of nanometer particles provided on the laminate shown in FIG. 4.

Referring to FIGS. 1 and 5, at 14, nanometer metal particles 23 are provided on areas of the first substrate 21 that are exposed from the useful areas of the silicon-based film 22. The nanometer metal particles may be made of platinum or gold.

A metal electrode 24 is coated on the first substrate 21 opposite to the silicon-based film 22. The metal electrode 24 is made of a titanium-palladium-silver alloy. The metal electrode 24 is preferably made of titanium nitride.

Figure 6:
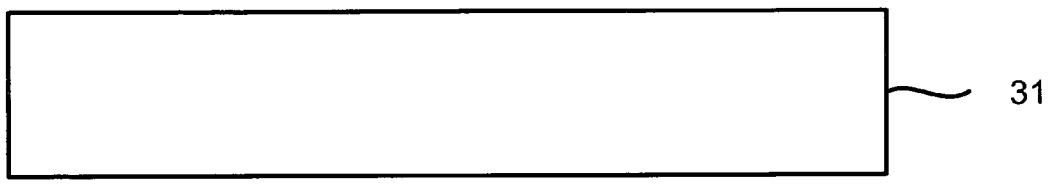
FIG. 6 is a side view of a second substrate used in the method shown in FIG. 1.

Referring to FIGS. 1 and 6, at 15, there is provided a second substrate 31. The second substrate 31 is made of glass.

Figure 7:
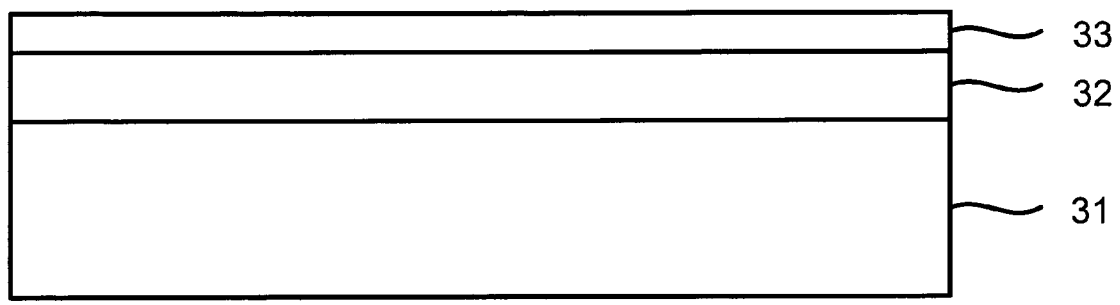
FIG. 7 is a side view of a transparent conductive film and a metal catalytic film provided on the second substrate shown in FIG. 6.

Referring to FIGS. 1 and 7, a transparent conductive film 32 is grown on the second substrate 31. A metal catalytic film 33 is grown on the transparent conductive film 32. The metal catalytic film 33 may be made of platinum.

Figure 8:
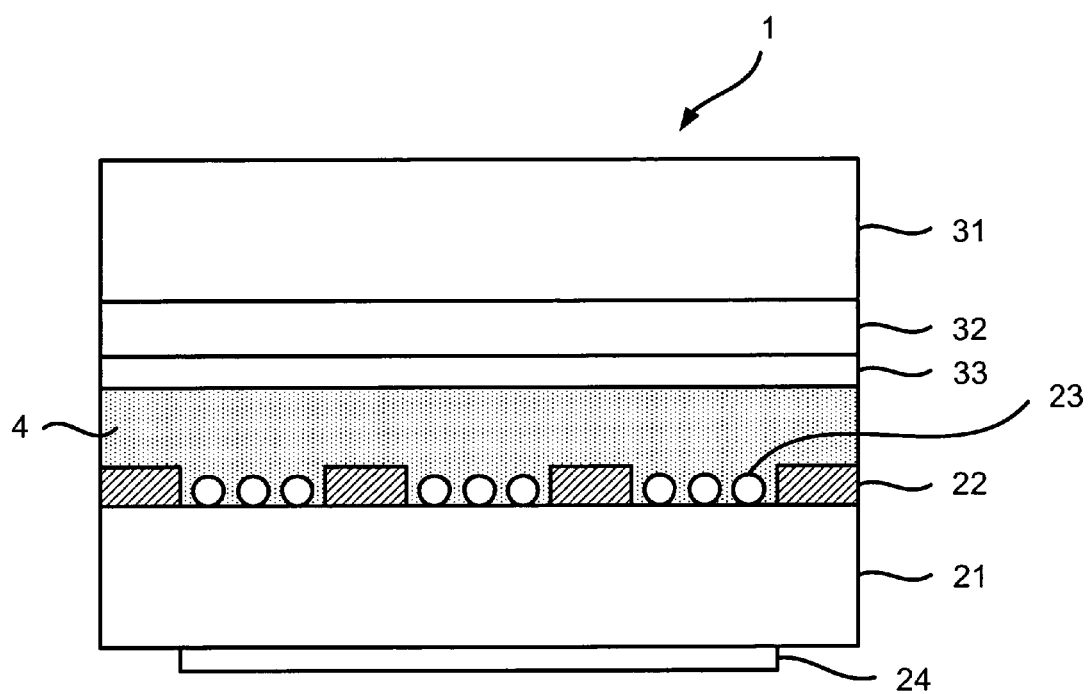
FIG. 8 is a side view of the laminate shown in FIG. 7 provided on the laminate shown in FIG. 5.
Figure 9:
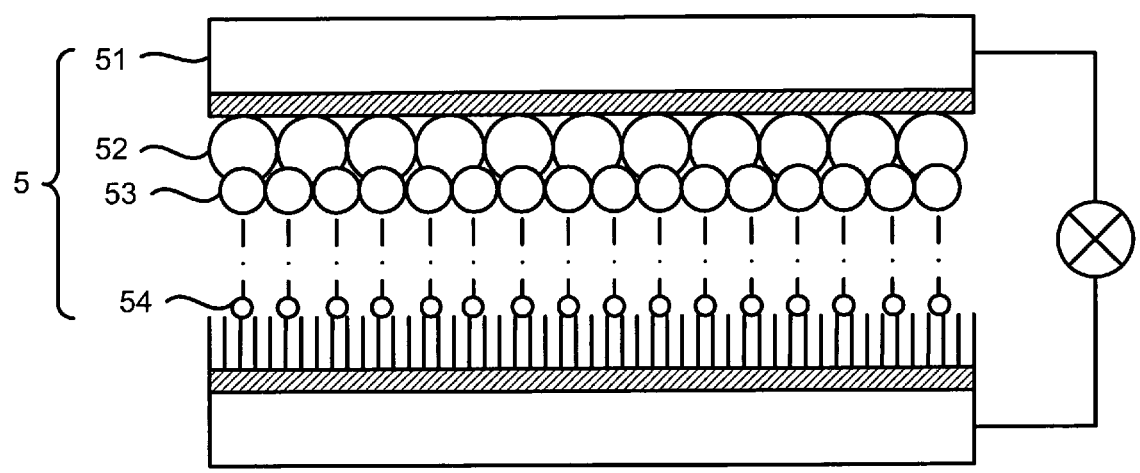
FIG. 9 is a side view of a conventional electrode of a nanometer crystal film solar cell.

Referring to FIGS. 1 and 8, at 17, the laminate shown in FIG. 7 is inverted and provided over the laminate shown in FIG. 5. Electrolyte 4 is filled between the laminates and, more particularly, the first substrate 21 and the metal catalytic film 33. Thus, there is provided a solar cell 1 with sensitized quantum dots.

In operation, the quantum dots made of the nanometer metal particles absorb visible light of sunlit and convert photons into electron-hole pairs. The hot electrons convert photons into electron-hole pairs efficiently. The photovoltaic efficiency and photocurrent are increased. Moreover, the cost is reduced.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making solar cells with sensitized quantum dots comprising the steps of:
   providing a first substrate;
   growing a silicon-based film on a side of the first substrate;
   executing a pattern mask process to etch areas of the silicon-based film;
   providing nanometer metal particles on areas of the first substrate exposed from the silicon-based film;
   attaching a metal electrode to an opposite side of the first substrate;
   providing a second substrate;
   growing a transparent conductive film on the second substrate;
   growing a metal catalytic film on the transparent conductive film so that the second substrate, the transparent conductive film and the metal catalytic film together form a laminate;
   inverting and providing the laminate on the first substrate; and
   providing electrolyte between the first substrate and the metal catalytic film.

2. The method according to claim 1, wherein the first substrate is made of a material selected from a group consisting of sapphire, quartz, silicon carbide and polyethylene.

3. The method according to claim 1, wherein the silicon-based film is made of a material selected from a group consisting of silicon dioxide and silicon nitride.

4. The method according to claim 1, wherein the nanometer metal particles are made of a material selected from a group consisting of platinum and gold.

5. The method according to claim 1, wherein the metal electrode is made of titanium nitride.

6. The method according to claim 1, wherein the second substrate is made of glass.

7. The method according to claim 1, wherein the metal catalytic film is made of platinum.

* * * * *